United States Patent Office 3,784,589
Patented Jan. 8, 1974

3,784,589
2-CARBOMETHOXY-1-METHYLVINYL ETHYL PHOSPHONOTHIOATES
George B. Large, Pinole, Calif., assignor to Stauffer Chemical Company, New York, N.Y.
No Drawing. Filed Sept. 21, 1970, Ser. No. 74,136
Int. Cl. A01n 9/36; C07f 9/40
U.S. Cl. 260—941                          9 Claims

ABSTRACT OF THE DISCLOSURE

New compounds corresponding to the formula $$R-P\underset{O-C=CH}{\overset{X\;\;R_1}{\underset{|}{\diagup}}}\;\;CO_2-CH_3$$
$$\phantom{R-P\,O-C=C}|$$
$$\phantom{R-P\,O-C=CH}R_2$$

wherein X can be sulfur or oxygen; R can be selected from a group consisting of alkyl, haloalkyl, alkoxy, thioalkyl and aryl; $R_1$ can be selected from a group consisting of thioalkyl, aminoalkyl, thioalkylnitrile, thioalkyl acetate, thioalkyl acetamide, thioalkynyl, amine, thioaryl, nitroaryl, halogenated thioaryl, thioalkylaryl, amino oxazolidine, keto oxime, aminoaryl, aminocycloalkyl, aminoalkylaryl, amino furfuryl, cycloalkylamine alkoxy, and alkenyloxy; and $R_2$ can be selected from a group consisting of aryl and alkyl. The compositions described herein are useful as insecticides and miticides.

DESCRIPTION OF THE INVENTION

The present invention is concerned with a novel group of compounds which can be generally described as vinyl phosphorus derivatives, and are used as pesticides, especially effective against mites and insects.

The compounds are represented by the general formula $$R-P\underset{O-C=CH}{\overset{X\;\;R_1}{\underset{|}{\diagup}}}\;\;CO_2-CH_3$$
$$\phantom{R-P\,O-C=CH}R_2$$

wherein R can be selected from a group consisting of alkyl, haloalkyl, alkoxy, thioalkyl and aryl; $R_1$ can be selected from a group consisting of thioalkyl, aminoalkyl, thioalkylnitrile, thioalkyl acetate, thioalkyl acetamide, thioalkylnyl, amine, thioaryl, halogenated thioaryl, nitroaryl, thioalkylaryl, amino oxazolidine, keto oxime, aminoaryl, aminocycloalkyl, aminoalkylaryl, amino furfuryl, cycloalkylamine alkoxy, and alkenyloxy; and $R_2$ can be selected from a group consisting of aryl and alkyl; and X can be sulfur or oxygen.

The compounds represented by the above formula can be generally synthesized by one of two methods.

Method 1

This first method is a general procedure and can be applied to the synthesis of a greater variety of products falling within the scope of the above-noted general formula. Thus, compounds are synthesized by reacting a phosphoro dichloridate with a beta-keto ester in the presence of a solvent such as benzene, tetrahydrofuran and the like, and a base. The product formed by this reaction is then reacted with an appropriate nucleophilic reagent to form the end product. This latter reaction is carried out in the presence of a base. Compounds numbered 1 through 9 and 18 through 60 were synthesized by this procedure.

Method 2

This method is more specific and is limited to the phosphonodithio analogs encompassed by the general formula above-described. Thus, the compounds can be synthesized by reacting an alkyl thionophosphine sulfide with a beta-keto ester in the presence of a solvent such as benzene, tetrahydrofuran and the like, and a base to form the appropriate salt of the O-enol phosphonodithioic acid. This intermediate is not isolated and is reacted with a suitable halide to form the end product. Compounds numbered 10 through 17 were synthesized by this procedure.

In order to illustrate the merits of the present invention, the following examples are provided.

EXAMPLE 1

Preparation of 2-carbomethoxy-1-methylvinyl ethylphosphonothio chloride

To a stirring mixture of 178.3 parts (1.1 moles) of ethylphosphonothio dichloridate and 116.2 parts (1.0 moles) methyl acetoacetate in 1 liter of benzene at 10° was dripped a solution of 111.1 parts (1.1 moles) triethylamine in 100 ml. benzene. A temperature of 10° C. was maintained during the addition of the base. The mixture was allowed to attain ambient temperature and then heated to 60° C. for four hours, cooled and washed with 300 ml. of dilute aqueous HCl and twice with 300 ml. ice water, dried over anhydrous $MgSO_4$ and volatiles removed on rotary evaporator. The product was distilled collecting that fraction which came off at 93–96°/0.12 mm. The yield was 149.9 parts or 62%.

EXAMPLE 2

Preparation of 2-carbomethoxy-1-methyl-vinyl-N-(2-propyl) ethylphosphonamidothionate Dissolve 6.05 parts (0.025 moles) of 2-carbomethoxy-1-methylvinyl ethylphosphonothio chloridate and 3.54 parts isopropyl amine in 100 ml. benzene and stirred for two hours at room temperature. The product was washed with dilute aqueous HCl and water until neutral, dried over an hydrous $MgSO_4$ and volatiles removed on rotary evaporator. The yield was 7.5 parts or 76%; $n_D^{30}$ 1.5080.

EXAMPLE 3

Preparation of O-(2-carbomethoxy-1-methylvinyl)-S-ethyl-ethylphosphonodithioate

To a stirring solution of 7.4 parts (0.03 mole) ethylthionophosphine sulfide dimer and 10 ml. triethylamine in 150 ml. benzene was added 7.0 parts (0.06 mole) methyl acetoacetate. The mixture was stirred for 30 minutes. Then, 11.0 parts (0.07 mole) of ethyl iodide was added and warmed to 50° C. and stirred for 2 hours. The mixture was cooled and washed with 50 ml. of 5% $NaHCO_3$, 50 ml. 10% aqueous HCl and water until neutral, dried over anhydrous $MgSO_4$ and volatiles removed on rotary evaporator. The yield was 13.0 parts of 81%; $n_D^{30}$ 1.5312.

Other compounds were prepared in an analogous manner starting with the appropriate starting materials, as outlined above. The following is a table of compounds representative of those embodied by the present invention. Compound numbers have been assigned to them and are used for identification throughout the balance of the specification.

TABLE I

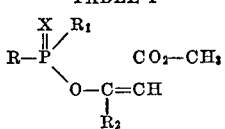

| Cpd. No. | R | X | R₁ | R₂ |
|---|---|---|---|---|
| 1 | $C_2H_5$ | S | $S-C_2H_5$ | ⟨phenyl⟩ |
| 2 | $ClCH_2$ | S | $NHCH(CH_3)_2$ | $CH_3$ |
| 3 | $ClCH_2$ | S | $SCH_2CH_3$ | $CH_3$ |
| 4 | ⟨phenyl⟩ | S | $NHCH(CH_3)_2$ | $CH_3$ |
| 5 | $CH_3O$ | S | $NHCH(CH_3)_2$ | $CH_3$ |
| 6 | $CH_3S$ | O | $NHCH(CH_3)_2$ | $CH_3$ |
| 7 | $CH_3O$ | S | $SCH_2CH_3$ | $CH_3$ |
| 8 | ⟨phenyl⟩ | S | $SCH_2CH_3$ | $CH_3$ |
| 9 | $C_2H_5$ | S | $NHCH(CH_3)_2$ | $CH_3$ |
| 10 | $C_2H_5$ | S | $SCH_3$ | $CH_3$ |
| 11 | $C_2H_5$ | S | $SCH_2CH_3$ | $CH_3$ |
| 12 | $C_2H_5$ | S | $SCH_2C\equiv N$ | $CH_3$ |
| 13 | $C_2H_5$ | S | $SCH_2\overset{O}{\overset{\|}{C}}-O-CH_2CH_3$ | $CH_3$ |
| 14 | $C_2H_5$ | S | $SCH_2\overset{O}{\overset{\|}{C}}-NHCH_3$ | $CH_3$ |
| 15 | $C_2H_5$ | S | $SCH_2$⟨phenyl⟩$-Cl$ | $CH_{22}$ |
| 16 | $C_2H_5$ | S | $SCH_2SCH_2CH_3$ | $CH_3$ |
| 17 | $C_2H_5$ | S | $SCH_2C\equiv CH$ | $CH_3$ |
| 18 | $C_2H_5$ | S | $NHCH(CH_3)_2$ | $CH_3$ |
| 19 | $C_2H_5$ | S | $NH_2$ | $CH_3$ |
| 20 | $C_2H_5$ | S | $NHCH_3$ | $CH_3$ |
| 21 | $C_2H_5$ | S | $N(CH_3)_2$ | $CH_3$ |
| 22 | $C_2H_5$ | S | $NHCH_2CH_3$ | $CH_3$ |
| 23 | $C_2H_5$ | S | $S$-⟨phenyl⟩ | $CH_3$ |
| 24 | $C_2H_5$ | S | $S$-⟨phenyl⟩$-Cl$ | $CH_3$ |
| 25 | $C_2H_5$ | S | $SCH_2CH_2CH_3$ | $CH_3$ |
| 26 | $C_2H_5$ | S | $O$-⟨phenyl⟩$-NO_2$ | $CH_3$ |
| 27 | $C_2H_5$ | S | $NHC(CH_3)_3$ | $CH_3$ |
| 28 | $C_2H_5$ | S | $O$-⟨phenyl (SCH₃, CH₃)⟩ | $CH_3$ |
| 29 | $C_2H_5$ | S | $O$-⟨phenyl (Cl, Cl, Cl)⟩ | $CH_3$ |
| 30 | $C_2H_5$ | S | ⟨N=C(O)N(CH₂-CH₃)-CH₃⟩ | $CH_3$ |
| 31 | $C_2H_5$ | S | $NHCH_2CH_2CH_3$ | $CH_3$ |
| 32 | $C_2H_5$ | S | $NHCH(CH_3)_2$ | $CH_3$ |
| 33 | $C_2H_5$ | S | $O-N=C(CH_3)_2$ | $CH_3$ |
| 34 | $C_2H_5$ | S | $ON=\overset{CH_3}{\overset{\|}{C}}-\overset{H}{\overset{\|}{C}}CH_3\ \ CH_3$ | $CH_3$ |
| 35 | $C_2H_5$ | S | $NH$-⟨phenyl⟩ | $CH_3$ |
| 36 | $C_2H_5$ | S | $NHCH_2CH=CH_2$ | $CH_3$ |
| 37 | $C_2H_5$ | S | ⟨pyrrolidinyl N⟩ | $CH_3$ |
| 38 | $C_2H_5$ | S | $NH-\overset{CH_3}{\overset{\|}{CH}}-CH_2OCH_3$ | $CH_3$ |
| 39 | $C_2H_5$ | S | $NH-\overset{CH_3}{\overset{\|}{CH}}-CH_2-CH_2-CH_3$ | $CH_3$ |
| 40 | $C_2H_5$ | S | $NH\overset{CH_2-CH_3}{\overset{\|}{CH}}\ CH_2-CH_3$ | $CH_3$ |
| 41 | $C_2H_5$ | S | $NHCH_2$-⟨phenyl⟩ | $CH_3$ |
| 42 | $C_2H_5$ | S | $NH\overset{CH_3}{\overset{\|}{CH}}-\overset{CH-CH_3}{\overset{\|}{CH_2-CH_3}}$ | $CH_3$ |
| 43 | $C_2H_5$ | S | ⟨CH₃-N-CH₂-furanyl⟩ | $CH_3$ |
| 44 | $C_2H_5$ | S | $NH-\overset{CH_3}{\overset{\|}{CH}}-CH_2-CH(CH_3CH_3)_2$ | $CH_3$ |
| 45 | $C_2H_5$ | S | $NH-\overset{CH_3}{\overset{\|}{CH}}C(CH_3)_3$ | $CH_3$ |
| 46 | $C_2H_5$ | S | $NH(CH_2)_6-CH_3$ | $CH_3$ |
| 47 | $C_2H_5$ | S | $NH$-⟨thienyl S⟩ | $CH_3$ |
| 48 | $C_2H_5$ | S | $NH(CH_2)_3CH_3$ | $CH_3$ |
| 49 | $C_2H_5$ | S | $NHCH_2CH(CH_3)_2$ | $CH_3$ |
| 50 | $C_2H_5$ | S | $NH(CH_2)_4CH_3$ | $CH_3$ |
| 51 | $C_2H_5$ | S | $NHCH_2\overset{CH_2-CH_3}{\overset{\|}{CH}}(CH_2)_3CH_3$ | $CH_3$ |
| 52 | $C_2H_5$ | S | $NH(CH_2)_{11}CH_3$ | $CH_3$ |
| 53 | $C_2H_5$ | S | $NHCH_2CH_2$-⟨phenyl⟩ | $CH_3$ |
| 54 | $C_2H_5$ | S | $S-CH(CH_3)_2$ | $CH_3$ |
| 55 | $C_2H_5$ | S | $S(CH_2)_3-CH_3$ | $CH_3$ |
| 56 | $C_2H_5$ | S | $OCH_3$ | $CH_3$ |
| 57 | $C_2H_5$ | S | $OCH_2CH_3$ | $CH_3$ |
| 58 | $C_2H_5$ | S | $NH(CH_2)_2SCH_3$ | $CH_3$ |
| 59 | $C_2H_5$ | S | $OCH(CH_3)_2$ | $CH_3$ |
| 60 | $C_2H_5$ | S | $OCH_2CH=CH_2$ | $CH_3$ |

TESTING PROCEDURE (I) House fly (*Musca domestica* (L.))

(A) Film residue: A stock solution containing 100 μg./ml. of the toxicant in an appropriate solvent is prepared. Aliquots of this solution are combined with one ml. of an acetone-peanut oil solution in a dish, 55 mm. in diameter, and allowed to dry. The aliquots are varied to achieve desired toxicant concentrations ranging from 100 μg. per dish to that at which 50% mortality is obtained. The dishes are placed in a circular cardboard cage, closed on the bottom with cellophane and covered on top with cloth netting. Twenty-five female house flies are introduced into the cage and the percent mortality is recorded after 48 hours. LD-50 values are expressed in terms of μg. 25 ♀ flies.

(II) German cockroach (*Blattella germanica* (Linné))

Ten one-month nymphs are placed into a circular cardboard cage sealed on one end with cellophane and covered by cloth netting on the other. Aliquots of the toxicant, dissolved in an appropriate solvent, are diluted in water to which has been added 0.0002% of a conventional wetting agent such as polyoxy-ethylene sorbitan monolaurate ether of alkylated phenols blended with organic sulfonates. Test concentrations range from 0.1% to that at which 50% mortality is obtained. Each of these aqueous suspensions are sprayed onto the insects, through the cloth netting, by means of a hand spray gun. Percent mortality is recorded after 72 hours and the LD–50 values are expressed as percent of toxicant in the aqueous spray.

(III) Lygus bug (*Lygus hesperus* (Knight))

Same as for the German cockroach (II) except that the test concentrations range from 0.05% to that at which 50% mortality is obtained.

(IV) Salt-marsh caterpillar (*Estigmene acrea* (Drury))

Test solutions are prepared in an identical manner and concentrations are the same as those for the German cockroach (II). Sections of bitter dock (*Rumex obtusifolius*) leaves, 1–1.5 inches in length are immersed in the test solutions for 10–15 seconds and placed on a wire screen to dry. The dried leaf is placed on a moistened piece of filter paper in a petri dish and infested with five third-instar larvae. Mortality of the larvae is recorded after 72 hours and the LD–50 values are expressed as percent active ingredient in the aqueous suspensions.

(V) Beet armyworm (*Spodoptera exigua* (Hübner))

Same as for salt marsh caterpillar except the leaves of Romaine lettuce (*Latuca sativa*) were used as the host plant.

(VI) Tobacco budworm (*Heliothis virescens* (F.))

Same as for salt marsh caterpillar except the leaves of Romaine lettuce (*Latuca sativa*) were used as the host plant.

(VII) Black bean aphid (*Aphis fabae* (Scop.))

Nasturtium (*Tropaeolum* sp.) plants, approximately 2–3 inches tall, are transplanted into sandy loam soil in 3 inch clay pots and infested with 50–75 aphids of mixed ages. Twenty-four hours later they are sprayed, to the point of runoff, with aqueous suspensions of the toxicant. The suspensions are prepared as in previously described tests (II, III, IV and V). Test concentrations ranged from 0.05% to that at which 50% mortality is obtained. Mortality is recorded after 48 hours and the LD–50 values are expressed as percent active ingredient in the aqueous suspensions.

(VIII Two-spotted mite (*Tetranychus urticae* (Koch))

Same as for the black bean aphid (VII) except that pinto beans (*Phaseolus* sp.) are utilized as the host plant rather than nasturtiums.

(IX) Systemic tests (A) Black bean aphid: Aliquots of the toxicant dissolved in an appropriate solvent are incorporated into 1 pound samples of sandy loam soil and placed into 1 pint ice-cream cartons. Test concentrations range from 10 p.p.m. of toxicant per pound of soil down to that at which 50% mortality is obtained. Nasturtium (*Tropaeolum* sp.) plants approximately 2–3 inches tall are transplanted into the treated soil and infested with 50–75 aphids of various ages. Mortality is recorded 72 hours after infestation, and LD–50 values are expressed as p.p.m. of active ingredient per pound of soil.

(B) Two-spotted mite: Aliquots of the toxicant dissolved in an appropriate solvent are diluted in water and placed in glass bottles. Concentrations of active ingredient range from 10 p.p.m. to that at which 50% mortality is obtained. Pinto bean (*Phaseolus sp.*) plants with expanded primary leaves are placed in the solution so that the roots and major portions of the stem are completely immersed. Immediately after, the leaves are infested with 75–100 mites of various ages. Mortality of adults, nymphs and eggs is recorded after one week, and LD–50 values are expressed as p.p.m. of toxicant in the aqueous suspensions.

The results of the above tests are set forth in the following table.

TABLE II.—$LD_{50}$ VALUES

| Compound number | HF, μg./25♀ | GR, percent | LB, percent | BA, percent | BAS, percent | SMC, percent | TBW, percent | BAW, percent | Two-spotted mites PE, percent | Eggs, percent | SYS, percent |
|---|---|---|---|---|---|---|---|---|---|---|---|
| 1 | 100 | >.1 | >.05 | >.05 |  | >.1 | >.1 | >.1 | .03 | .03 | >10 |
| 2 | 4 | .01 | .003 | .003 | 3 | >.1 | .03 | .03 | .003 | .005 |  |
| 3 | >100 | .05 | .03 | .03 | >10 | >.1 | .08 | .008 | >.05 | >.05 |  |
| 4 | >100 | >.1 | .03 | .005 | >10 | >.1 | .1 | .1 | >.05 | >.05 |  |
| 5 | >100 |  |  | >.05 |  | >.1 |  |  | >.05 | >.05 |  |
| 6 | 30 | >.1 | .01 | .003 | .8 | >.1 | >.1 | >.1 | .05 | >.05 |  |
| 7 | >100 |  |  | >.05 |  |  |  |  | >.05 | >.05 |  |
| 8 | 100 |  |  | >.05 |  | >.1 |  |  | >.05 | >.05 |  |
| 9 | 12 | .03 | .03 | .003 | .7 | .05 | .1 | >.1 | .05 | >.05 | 3 |
| 10 | 30 | >.1 | .008 | .005 | >10 | .1 | .1 | .1 | .05 | >.05 | >10 |
| 11 | 6 | .03 | .003 | .003 | >10 | .01 | .03 | .001 | .05 | >.05 | >10 |
| 12 | 80 | .08 | .01 | .008 | >10 | >.1 | >.1 | >.1 | .03 | >.05 | >10 |
| 13 | 30 | >.1 | .05 | .05 | >10 | >.1 | >.1 | >.1 | >.05 | >.05 |  |
| 14 | 30 | >.1 | >.05 | .03 | >10 | >.1 | >.1 | >.1 | >.05 | >.05 |  |
| 15 | >100 | >.1 | >.05 | >.05 |  | >.1 | >.1 | >.1 | .03 | >.05 | >10 |
| 16 | 30 | .08 | .003 | .001 | >10 | >.1 | .1 | >.1 | .03 | >.05 | >10 |
| 17 | 15 | .05 | .01 | .008 | >10 | >.1 | >.1 | >.1 | >.05 | >.05 |  |
| 18 | 3 | .03 | .005 | .003 | .3 | .08 | .03 | .01 | .003 | .003 | .3 |
| 19 | 1.5 | .005 | .001 | .003 | 1 | >.1 | >.1 | .01 | .003 | >.05 | .8 |
| 20 | 2 | .05 | .008 | .003 |  | >.1 | .01 | .01 | >.05 | >.05 |  |
| 21 | 15 | >.1 | >.05 | >.05 | >10 | >.1 | >.1 | >.1 | >.05 | >.05 |  |
| 22 | 3 | .01 | .001 | .003 | 1 | .01 | .08 | .03 | .005 | .008 | .8 |
| 23 | 30 | >.1 | .05 | .003 | >10 | .03 | .03 | .008 | .05 | >.05 |  |
| 24 | >100 |  |  | >.05 |  | >.1 |  |  | >.05 | >.05 |  |
| 25 | 10 | .01 | .008 | .008 | >10 | .005 | .003 | .003 | .01 | .03 | >10 |
| 26 | 100 | >.1 | .03 | .008 | >10 | >.1 | .1 | .03 | >.05 | >.05 |  |
| 27 | >100 | >.1 | >.05 | .008 | >10 | >.1 | >.1 | .03 | >.05 | >.05 | >10 |
| 28 | >100 | >.1 | .03 | .03 | >10 | >.1 | >.1 | .1 | .03 | .03 | >10 |
| 29 | >100 | >.1 | >.05 | .03 | >10 | >.1 | >.1 | >.1 | >.05 | >.05 |  |
| 30 | 30 | >.1 | .008 | .003 | 10 | >.1 | >.1 | >.1 | .003 | .003 | 5 |
| 31 | 4 | .01 | .008 | .0008 | 1 | .03 | .005 | .005 | .003 | .003 | .5 |
| 32 | 30 | >.1 | .03 | .003 | >10 | .03 | .05 | >.1 | >.05 | >.05 |  |
| 33 | 5 | .03 | .003 | 003 | 8 | >.1 | .03 | .003 | .03 | .05 | 8 |
| 34 | 40 | .1 | .03 | .03 | >10 | >.1 | >.1 | .1 | >.05 | >.05 |  |
| 35 | >100 | >.1 | >.05 | .01 | >10 | >.1 | .1 | .03 | >.05 | >.05 |  |
| 36 | 5 | .01 | .003 | .0005 | 3 | >.1 | .08 | .03 | .008 | .05 | .8 |
| 37 | >100 | >.1 | .005 | .05 | >10 | >.1 | >.1 | >.1 | >.05 | >.05 |  |

TABLE II—Continued

| Compound number | HF, µg./25 ♀ | GR, percent | LB, percent | BA, percent | BAS, percent | SMC, percent | TBW, percent | BAW, percent | Two-spotted mites PE, percent | Eggs, percent | SYS, percent |
|---|---|---|---|---|---|---|---|---|---|---|---|
| 38 | 6 | .03 | .001 | .0003 | 3 | .01 | .1 | .05 | .03 | >.05 | .8 |
| 39 | 15 | .003 | .001 | .0008 | 8 | >.1 | .03 | .05 | .03 | >.05 | 3 |
| 40 | 15 | .01 | .001 | .0003 | 5 | .05 | .05 | .05 | .01 | .03 | 8 |
| 41 | 20 | >.1 | .03 | .0008 | >10 | >.1 | .8 | >.1 | .03 | .03 | >10 |
| 42 | 12 | .003 | .003 | .0008 | 3 | .01 | >.1 | .05 | .03 | .03 | >10 |
| 43 | 30 | >.1 | .03 | .03 | 10 | >.1 | >.1 | .1 | >.05 | >.05 | -------- |
| 44 | 30 | .01 | .003 | .003 | >10 | >.1 | .1 | .1 | .05 | >.05 | >10 |
| 45 | 12 | .1 | .0008 | .003 | 8 | >.1 | >.1 | .1 | >.05 | >.05 | -------- |
| 46 | 30 | >.1 | .03 | .008 | >10 | >.1 | >.1 | .05 | >.05 | .03 | >10 |
| 47 | 12 | .01 | .0008 | .0008 | 1 | >.1 | .08 | .03 | .03 | >.05 | >10 |
| 48 | 5 | .003 | .0003 | .0003 | .5 | .05 | .01 | .008 | .003 | .03 | 3 |
| 49 | 4 | .005 | .0003 | .0003 | .8 | .03 | .003 | .005 | .03 | >.05 | 3 |
| 50 | 90 | .008 | .005 | .0005 | >10 | >.1 | .05 | .03 | .05 | .03 | >10 |
| 51 | 10 | .1 | .05 | .003 | >.1 | >.1 | >.1 | >.1 | >.05 | >.05 | -------- |
| 52 | 95 | >.1 | .03 | .008 | >10 | >.1 | >.1 | >.1 | .03 | >.05 | >10 |
| 53 | 10 | .05 | .03 | .001 | >10 | .1 | .1 | .1 | .03 | .03 | >10 |
| 54 | 9 | .01 | .003 | .001 | 3 | 0.1 | .005 | .003 | .05 | >.05 | 1 |
| 55 | 14 | .03 | .003 | .003 | >10 | .05 | .05 | .03 | >.05 | >.05 | -------- |

What is claimed is:

1. Compounds corresponding to the formula

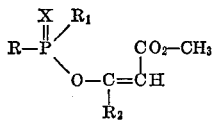

wherein X is sulfur; R is ethyl; R₁ can be selected from a group consisting of thioalkyl having 1 to 4 carbon atoms, thiopropynyl, and keto oxime having from 3 to 5 carbon atoms; and R₂ is methyl.

2. A compound as set forth in claim 1 wherein R₁ is methylthio.

3. A compound as set forth in claim 1 wherein R₁ is ethylthio.

4. A compound as set forth in claim 1 wherein R₁ is propynylthio.

5. A compound as set forth in claim 1 wherein R₁ is propylthio.

6. A compound as set forth in claim 1 wherein R₁ is O-(2-propanone oximino).

7. A compound as set forth in claim 1 wherein R₁ is O-(3-methyl-2-butanone oximino).

8. A compound as set forth in claim 1 wherein R₁ is isopropylthio.

9. A compound as set forth in claim 1 wherein R₁ is butylthio.

References Cited

UNITED STATES PATENTS

| | | | |
|---|---|---|---|
| 3,035,079 | 5/1962 | Berlger | 260—941 |
| 3,053,729 | 9/1962 | Sun | 260—941 UX |
| 3,450,801 | 6/1969 | Dawson et al. | 260—941 |

ANTON H. SUTTO, Primary Examiner

U.S. Cl. X.R.

260—307 F, 326.61, 347.2, 940, 942, 943; 424—200, 203, 210, 211, 212